E. P. GLEASON.

Argand Gas-Burner.

No. 6,491. Reissued June 22, 1875.

Witnesses:

William Prouwell

Charles S Ormsbee

Inventor.

Elliott P Gleason by Isaac A Brinnell his Attorney in fact

THE GRAPHIC CO. PHOTO-LITH. 39 & 41 PARK PLACE, N.Y.

UNITED STATES PATENT OFFICE.

ELLIOTT P. GLEASON, OF NEW YORK, N. Y.

IMPROVEMENT IN ARGAND GAS-BURNERS.

Specification forming part of Letters Patent No. 72,187, dated December 17, 1867; reissue No. 6,491, dated June 22, 1875; application filed September 24, 1870.

*To all whom it may concern:*

Figure 1:
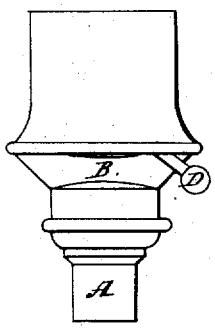
Figure 2:
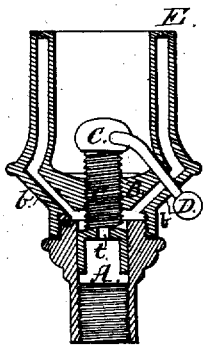
Figure 3:
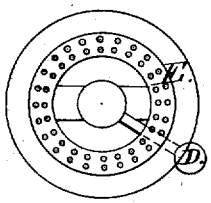

Be it known that I, ELLIOTT P. GLEASON, of the city, county, and State of New York, have invented certain Improvements in Argand Gas-Burners, of which the following is a specification, in which reference is had to the accompanying drawings making part of the same:

In said drawings, Figure 1 is an elevation of an argand gas-burner having my improvement. Fig 2 is a vertical cross-section of the same. Fig. 3 is an elevation, and Fig. 4 is a cross-section of a modification of the same. Fig. 5 is a plan or top view of Fig. 1.

Similar letters indicate corresponding parts in all the figures.

My improvement relates to the combination of a regulating mechanism with an argand gas-burner; and consists in arranging with an inlet or opening through which the gas-supply is admitted an adjustable valve or stopper, connected with a lever or suitable device outside of the burner, by means of which the valve may be adjusted to open and close the inlet and increase or diminish the supply of gas at will.

As shown in the drawing, the gas-burner is in two parts, A and B, which are united in a close joint by screw-threads at *e*. The construction of the upper part B, as shown, is that of an ordinary argand-burner, except that it has two rows of jet-openings, instead of one row at the tip where the gas is delivered to the flame. The interior of the lower part A is separated from that of the part B by a partition across it, in the center of which is formed a smaller opening or inlet, *i*, through which all the gas-supply must enter and pass to the burner. A valve or stopper is arranged with the inlet *t* to open and close it, to admit the gas-supply, or to cut it off. As shown in the drawing, the end of the screw C is the said valve or stopper, the screw-thread is the means for lifting or depressing the valve with the inlet, and the outward extension of the screw-shank forms a valve-stem or connection with some suitable outside instrument or means for raising or depressing the valve within. A lever, D, is permanently attached to the outer end of the valve-stem for this purpose, and extends therefrom sufficiently beyond the range of the burner to be conveniently handled to shift its position between the two arms or branches *b b'* without liability of burning the fingers. As shown, the lever D turns and shifts the valve within the range of half a circle, and, by means of the multiply screw-thread on the valve-stem of extra sharp pitch, raises or depresses the end or valve, opens or closes the inlet, and admits or shuts off the gas-supply to the extent required for the desired illuminating effect, or to so nearly shut it off as to merely maintain combustion at the burner's tip, or to shut it off completely, and finally, to extinguish the flame. In performing this office the lever D also serves as an index to indicate by its position whether, and to what extent, the inlet is open or closed, and the consequent condition or extent of the gas-supply.

I do not claim, broadly, a regulating-screw, nor its combination with a gas-burner, as the same is old.

I claim, in an argand gas-burner—

1. A valve or stopper provided with screw-threads, or a device by means of which the valve is opened and closed by a partial turn or shifting movement, as described.

2. In an argand gas-burner, the lever D, as described, by means of which the adjustment of the valve is effected, and as an indicator of the valve's opening.

3. In an argand gas-burner, the combination of the inlet, the valve, and the lever D, substantially as described.

ELLIOTT P. GLEASON.

Witnesses:

ISAAC A. BROWNELL.

J. C. GRANGER.